United States Patent

[11] 3,590,801

| [72] | Inventor | George B. Long<br>Dayton, Ohio |
|---|---|---|
| [21] | Appl. No. | 880,610 |
| [22] | Filed | Nov. 28, 1969 |
| [45] | Patented | July 6, 1971 |
| [73] | Assignee | General Motors Corporation<br>Detroit, Mich. |

[54] SELF-CLEANING OVEN HAVING MEANS TO HANG AUXILIARY RANGE EQUIPMENT
5 Claims, 4 Drawing Figs.

[52] U.S. Cl. .................................................. 126/19 R,
126/273 R, 126/337 R
[51] Int. Cl. ..................................................... A21b 1/00,
F24c 15/16
[50] Field of Search........................................... 126/19, 39,
39 C, 273, 332, 337, 339, 340

[56] References Cited
UNITED STATES PATENTS
| 521,718 | 6/1894 | Koll.............................. | 126/39 C UX |
| 3,121,158 | 2/1964 | Hurk........................... | 126/273 X |

*Primary Examiner*—Charles J. Myhre
*Attorneys*—William S. Pettigrew and Frederick M. Ritchie ABSTRACT: A porcelain-coated self-cleaning oven has means to pyrolytically degrade food soil. The oven is formed with embossments to slidably support an oven rack. Hooks are provided on the top of the oven to suspend the racks and auxiliary range equipment vertically during cleaning.

INVENTOR
George B. Long
BY
Frederick M. Ritchie
ATTORNEY

SELF-CLEANING OVEN HAVING MEANS TO HANG AUXILIARY RANGE EQUIPMENT

The prior art discloses that a domestic oven will clean its own oven walls as well as the oven racks by pyrolytically degrading oven soil thereon if the oven temperature exceeds 750° F. or thereabouts for a period of time. Moreover, the prior art recognizes that other cooking utensils can be heat-cleaned along with the racks and the walls if they are left in the oven during a cleaning cycle. Such auxiliary range equipment as drip bowls, broil pans and the removable panels form other ovens have been thus cleaned.

The commercially available self-cleaning ovens are porcelain-coated as are the drip bowls, broil pans and removable panels mentioned above. An oven rack suitable for heat-cleaning is made of special materials and reinforced so that it will not sag at the elevated cleaning temperatures. Then, too, the positioning of the rack on the porcelain-coated embossments or rack guides is undesirable. Oxygen needed for pyrolysis cannot reach a soiled spot which is resting on a surface. Thus, the rack guides do not clean well beneath the rack. The same can be said for the drip bowls, broil pans and panels which rest on the rack during a cleaning cycle.

The weight of the rack on the oven embossment is also undesirable, if heat-cleaning temperatures are high enough to soften the porcelain. Pressure between mating porcelain surfaces accentuates the possibility of fusion and consequent marring of the porcelain.

Accordingly, it is an object of this invention to provide means in a heat-cleaning oven for hanging auxiliary oven equipment vertically rather than supporting it horizontally during a cleaning cycle.

A more specific object of the invention is the provision of hooks at the top of a heat-cleaning oven for suspending the oven rack, drip bowls and the like remote from each other during a cleaning cycle.

It is also an object of this invention to unload porcelain surfaces in a domestic oven during elevated heat-cleaning temperatures tending to soften the porcelain.

Further objects and advantages of the present invention will be apparent from the following description, reference being had to the accompanying drawings wherein preferred embodiments of the present invention are clearly shown.

Figure 1:
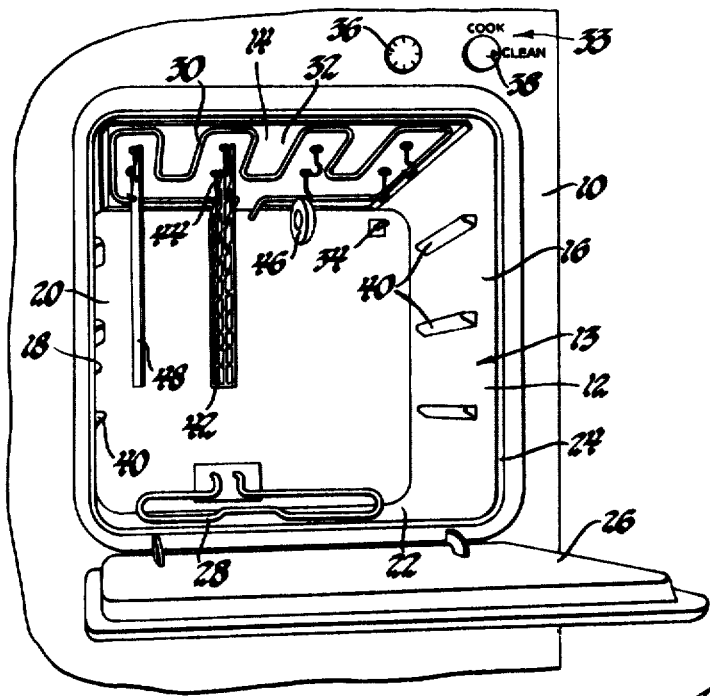
FIG. 1 is a front perspective view of a heat-cleaning oven with the door open to show one embodiment of the hanging arrangement of this invention.
Figure 2:
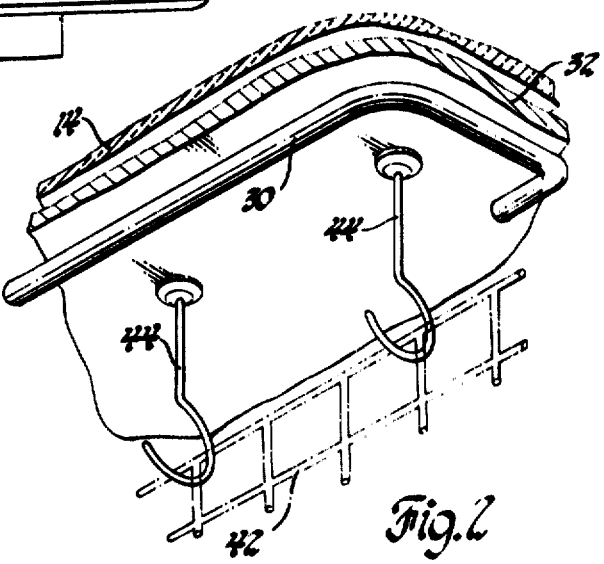
FIG. 2 is an enlarged fragmentary view of the hanging arrangement of FIG. 1.

In accordance with this invention and with reference to FIG. 1, a heat-cleaning wall oven 10 is illustrated. An oven compartment 12 for baking and broiling is defined by a sheet metal over liner 13 having a top wall 14, sidewalls 16 and 18, a backwall 20 and a bottom wall 22. The side, top and bottom walls form a front opening 24 closed by an oven door 26. All of the interior surfaces of the liner have a one-coat acid resistant porcelain finish.

Heat energy is supplied to the oven compartment by a bake-heating element 28 at the bottom of the oven and a broil-heating element 30 at the top. The broil-heating element is carried on a broil shield 32 of aluminized steel which is attached to the top wall 14 of the oven liner.

The control means 33 for the heating elements 28 and 30 may include a temperature sensor 34 in the oven, an oven bake thermostat 36 and a selector switch 38, the latter having a "cook" position and a "clean" position. The oven thermostat 36 is selectively settable by the user to establish either an oven-baking temperature between 150° F. and 550° F. or a broil-setting when the selector switch is in its "cook" position.

With the selector 38 in its "clean" position and the oven door 26 locked, the control means will establish a heat-cleaning temperature in the oven above about 800° F. At this time the thermostat 36 is shunted out of a controlling relationship in the control means.

For supporting food in the oven, the liner is provided with embossments 40. Wire racks or oven shelves 42 are adapted to be slidably positioned horizontally on the embossments during baking and broiling. However, in accordance with this invention the embossments are unloaded and exposed during heat-cleaning.

Hooks or hanger means 44 are fastened to the broil shield 32. The oven racks 42 may then be suspended vertically from the hooks during heat-cleaning. Moreover, other auxiliary range equipment such as drip bowls 46 and removable broil pans 48 can also be hung in the oven during a heat-cleaning cycle. Since this equipment, like the oven liner itself, is usually porcelain-coated, it, too, will be heat-cleaned without marring the porcelain coating. The hooks 44 are far enough apart that the hanging items are remote from each other and will not touch. No nook or cranny of the rack and other range equipment is hidden from the oxygen in the oven. No soil will resist degradation for lack of oxygen. Heavy soil accumulations will tend to flow off the hanging equipment and fall on the bottom wall of the oven where it will be closer to the heat source for improved degradation. At heat-cleaning temperature all surfaces will be exposed, unloaded and heat-cleaned.

Figure 3:
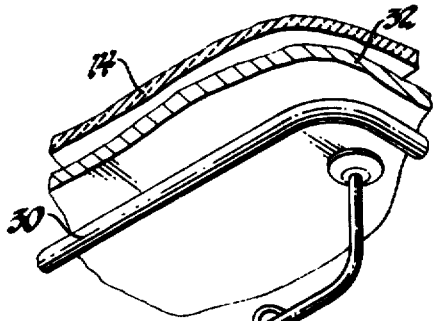
FIG. 3 is an enlarged fragmentary view of a second embodiment of this invention.
Figure 4:
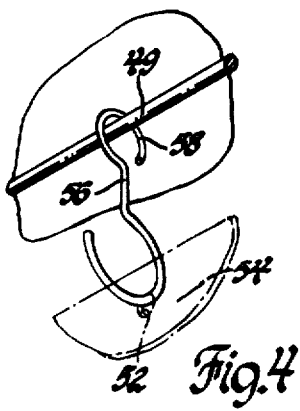
FIG. 4 is an enlarged fragmentary view of a third embodiment of this invention.

Variations within the purview of my invention are shown in FIGS. 3 and 4. In FIG. 3, a slide bar 49 is attached to the broil shield. Hooks 50 are slidably carried by the bar and positionable to accommodate a variety of hanging needs, such as ports 52 in a panel 54. It may be desirable to remove the hooks during normal oven usage. If so, hooks 56 (FIG. 4) are provided with open ends 58 for on-and-off attachment to the slide bar 48.

While the embodiment of the present invention as herein disclosed constitutes a preferred form, it is to be understood that other forms might be adopted.

What I claim is:

1. A self-cleaning oven comprising top, side, back and bottom walls defining a bake and broil compartment, shelf means for supporting food in said compartment for baking and broiling, embossment means on said side walls for supporting said shelf means horizontally in said compartment during said baking and broiling, heating means to supply heat energy to said compartment, control means for said heating means selectably user settable in a first position to control the heating means for establishing temperatures in said compartment within the range of 150° F. to 550° F. to effect a "cook" operation and user settable in a second position to control the heating means for establishing temperatures in said compartment generally above 800° F. to effect a "clean" operation, and cleaning means for said walls and said shelf means for degrading food and grease deposits thereon, said cleaning means including said control means settable in said second position to control said heating means to supply heat energy to said compartment to effect said "clean" operation and hanger means on said top wall for supporting said shelf means vertically in said compartment during said "clean" operation.

2. The self-cleaning oven of claim 1 wherein said top wall is a broil shield supporting said heating means.

3. The self-cleaning oven of claim 1 including a broil pan or the like usable horizontally on said shelf means in said oven during said broiling, and additional hanger means on said top wall supporting said broil pan or the like vertically in said compartment during said "clean" operation, said broil pan or the like and said embossment means being porcelain-coated.

4. The self-cleaning oven of claim 1 wherein said hanger means includes a slide bar connected to said top wall and hooks relatively slidably carried by said slide bar.

5. The self-cleaning oven of claim 4 wherein said hooks are removable from said slide bar.